A. F. DOW.
TEMPLE-ROLLER.
No. 176,171. Patented April 18, 1876.
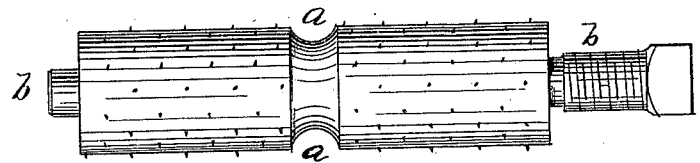
Fig. 1.
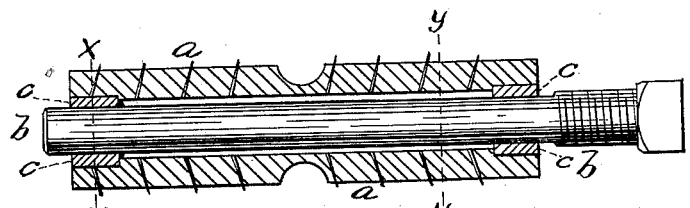
Fig. 2.
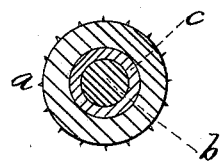  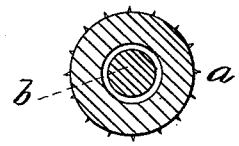
Fig. 3.   Fig. 4.

UNITED STATES PATENT OFFICE.

ALBERT F. DOW, OF FALL RIVER, MASSACHUSETTS.

IMPROVEMENT IN TEMPLE-ROLLERS.

Specification forming part of Letters Patent No. 176,171, dated April 18, 1876; application filed January 14, 1876.

*To all whom it may concern:*

Be it known that I, ALBERT F. DOW, of Fall River, in the county of Bristol and State of Massachusetts, have invented a new and valuable Improvement in Temple-Rollers; and I do hereby declare that the following is a full, clear, and exact description thereof, reference being had to the accompanying drawings, and to the letters of reference marked thereon.

This invention has for its purpose to prevent the wearing of the roller upon the pin. In order to accomplish this result, instead of allowing the roller to bear upon the pin, as is now common, I place a bushing of rawhide, or other material of an oily nature, inside the roller at each end, thus forming bearings which are not easily worn out, saving the wear upon the roller, and obviating all necessity for oiling the rollers.

In the accompanying illustration, Figure 1 is a side elevation of a temple-roller embodying my invention. Fig. 2 is a longitudinal section of the same. Fig. 3 is a transverse section through the line $x$, Fig. 2; and Fig. 4 is a transverse section through the line $y$, Fig. 2.

Similar letters of reference indicate corresponding parts.

$a$ represents the roller, and $b$ the pin. $c$ is a bushing of rawhide placed inside the roller $a$, at each end of the same, thus constituting a bearing for the pin $b$, and preventing its coming in contact with the roller $a$. This bushing $c$ is placed flush with the end of the roller so as to protect the wood from wear at that point. By the use of a rawhide bushing there is not only a saving of friction upon and consequent wear of the roller, but all necessity for oiling is done away with. The rawhide supplies its own oil or grease. Any hard substance permanently impregnated, either naturally or artificially, with oil or grease may be substituted for rawhide.

Having thus fully described my invention, what I claim, and desire to secure by Letters Patent, is—

In combination with a temple-roller, a bushing of rawhide, or other similar greasy substance, placed in either or both ends thereof, and supporting the interior of the roller from contact with the pin, substantially as and for the purpose described.

ALBERT F. DOW.

Witnesses:
HENRY W. WILLIAMS,
B. W. WILLIAMS.